(No Model.)
E. A. KNOWLTON & J. H. WAREHIME.
BUDDING TOOL.
No. 542,478. Patented July 9, 1895.
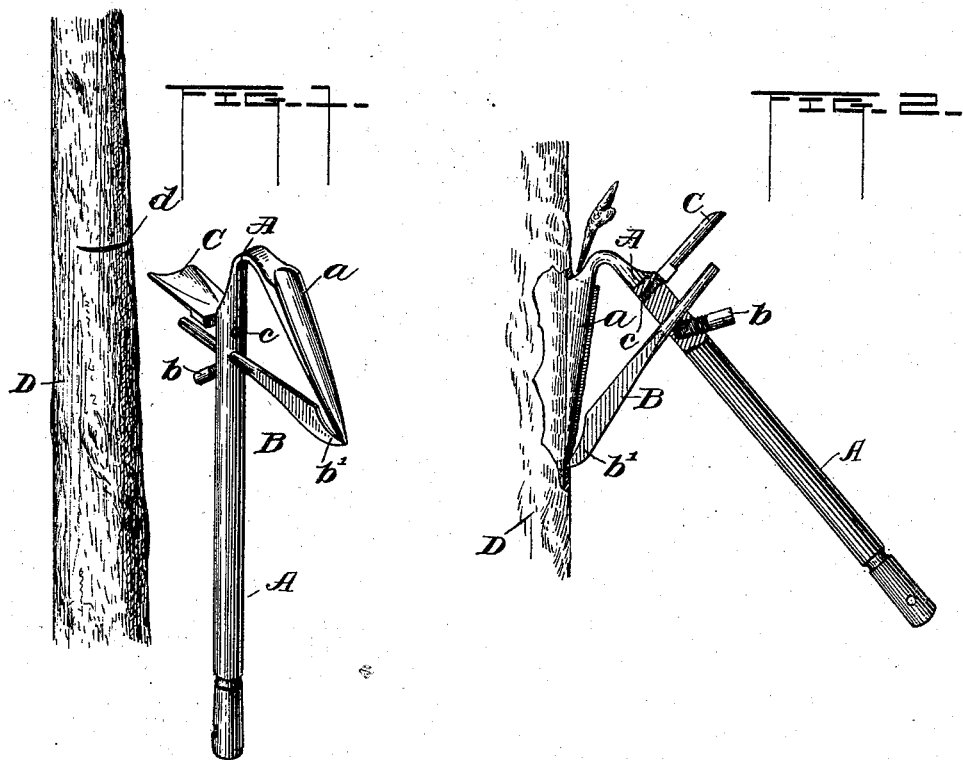
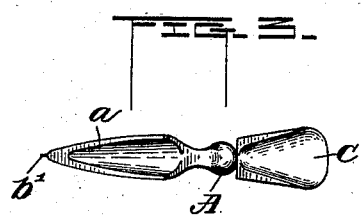

UNITED STATES PATENT OFFICE.

ELZA A. KNOWLTON AND JOHN H. WAREHIME, OF LEE, OHIO.

BUDDING-TOOL.

SPECIFICATION forming part of Letters Patent No. 542,478, dated July 9, 1895.

Application filed October 18, 1894. Serial No. 526,303. (No model.)

*To all whom it may concern:*

Be it known that we, ELZA A. KNOWLTON and JOHN H. WAREHIME, citizens of the United States, residing at Lee, in the county of Athens and State of Ohio, have invented certain new and useful Improvements in Budding-Tools; and we do hereby declare the following to be a full, clear, and exact description of the invention, such as will enable others skilled in the art to which it appertains to make and use the same.

This invention relates to a combination-tool, but more particularly to a tool for budding trees.

Primarily the object of our invention is to provide a simple, inexpensive, and effective tool which may be readily applied to the proper part of the tree for quickly and expeditiously preparing the same for the reception of the bud and for reducing the liability of having the sap of the tree affected by the air, as is liable to occur where the operation is not performed quickly.

A further object is to provide a guide whereby just sufficient of the bark is opened as will properly accommodate the bud when properly inserted therein, also to form the guide that it may serve as an aid in placing the bud in the right place.

With these and other objects in view the invention consists in the construction and combination of the parts, as will be more fully hereinafter described, and then defined in the claims at the end of the description.

Referring to the accompanying drawings, forming a part of this specification, Figure 1 is a perspective view of the device in position for making the preliminary cut in the tree preparatory to opening the bark for the reception of the bud. Fig. 2 is a side elevation, partly in section, of the tool, the bark of the tree being slitted and opened and the bud shown in position for insertion into the opening; and Fig. 3 is a plan view of the tool.

A designates a handle, which is preferably cylindrical and provided at one end with a guide $a$ formed integrally with the handle or secured thereto, as desired. This guide is concavo-convex in cross-section and extends outwardly and downwardly from the handle, the said guide tapering to a point and serving not only to guide the bud when inserting the same but to open the bark of the tree, as best shown in Fig. 2. Arranged below the guide $a$ is a knife B, adjustably secured in an aperture in the handle A by a screw $b$, which extends at an angle to the shank of the knife and engages the same with its end. The knife is arranged transversely of the handle and preferably inclines slightly downwardly, and is provided with a lower cutting-edge $b'$, which extends slightly beyond and is arranged below the end of the guide $a$ to slit the bark lengthwise in advance of said guide.

At C is a gouge secured to the handle in any suitable manner, but preferably by a screw-threaded shank $c$, as shown in the drawings.

The operation and manner of using the device will be readily understood from the foregoing description. It will be seen that by pressing the gouge C against the tree D a semicircular groove $d$ will be cut transversely thereof. By reversing the tool, as shown in Fig. 2, and the cutting-edge of the knife B inserted into the groove $d$ and drawn downwardly, a slit will be cut in the bark, the guide $a$ at the same time serving to open the bark and spread the same. The bud may now be inserted in the space between the tree and the concaved portion of the guide, which serves as a channel for forcing the bud home, after which the tool may be removed and the bark properly drawn together. The construction disclosed not only opens the bark the proper distance, but permits the same to be done simultaneously with the slitting.

It is obvious that the position of the gouge and the other parts may be changed, if desired, and that other changes may be made without departing from the spirit of our invention, and hence we do not desire to be confined to the exact construction shown and described.

Having thus fully described our invention, what we claim as new, and desire to secure by Letters Patent of the United States, is—

1. In a budding tool the combination with a handle, a concavo-convex tapering guide arranged on said handle, and a knife provided with a cutting edge in advance of said guide, whereby the bark may be slit and simultaneously opened for the insertion of the bud, substantially as described.

2. A tool of the character described comprising a handle, a concavo-convex guide extending outwardly and downwardly from the handle, and a knife provided with a cutting edge in advance and below the guide, substantially as described.

3. In a budding tool, the combination with a handle, of a concavo-convex tapering guide extending outwardly and downwardly from the handle, together with a knife adjustably held in the handle and provided with a cutting edge in advance and below the guide, substantially as described.

4. A budding tool, comprising a handle, a concavo-convex guide extending outwardly and downwardly from the handle, a knife provided with a cutting edge in advance and below the guide, and a gouge, substantially as described.

In testimony whereof we affix our signatures in presence of two witnesses.

ELZA A. KNOWLTON.
JOHN H. WAREHIME.

Witnesses:
A. M. RHODES,
S. L. PHILLIPS.